Dec. 13, 1927.
C. P. DUBBS
1,652,167
PROCESS OF TREATING HYDROCARBON OILS
Original Filed Jan. 2, 1918   6 Sheets-Sheet 1
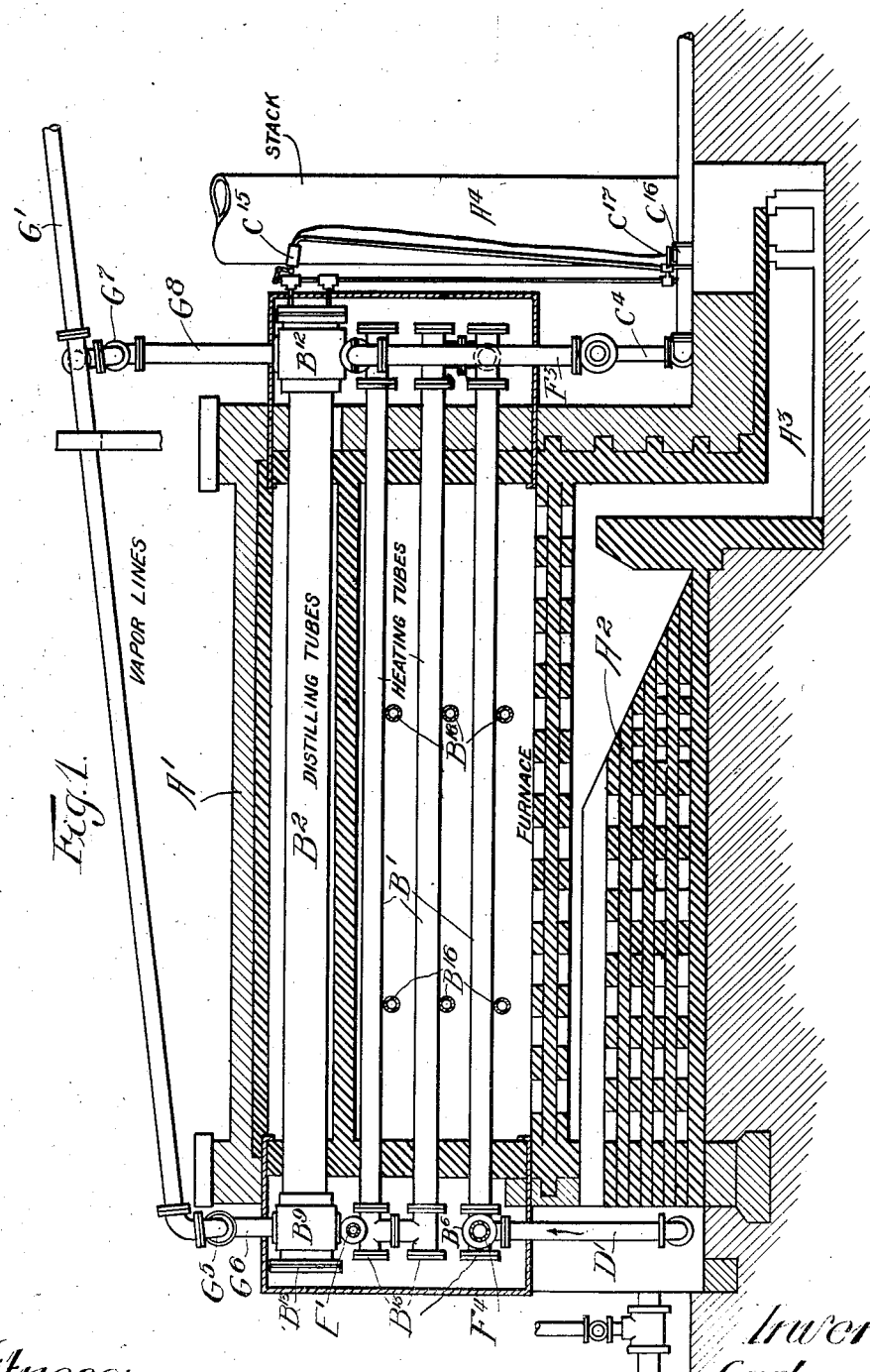

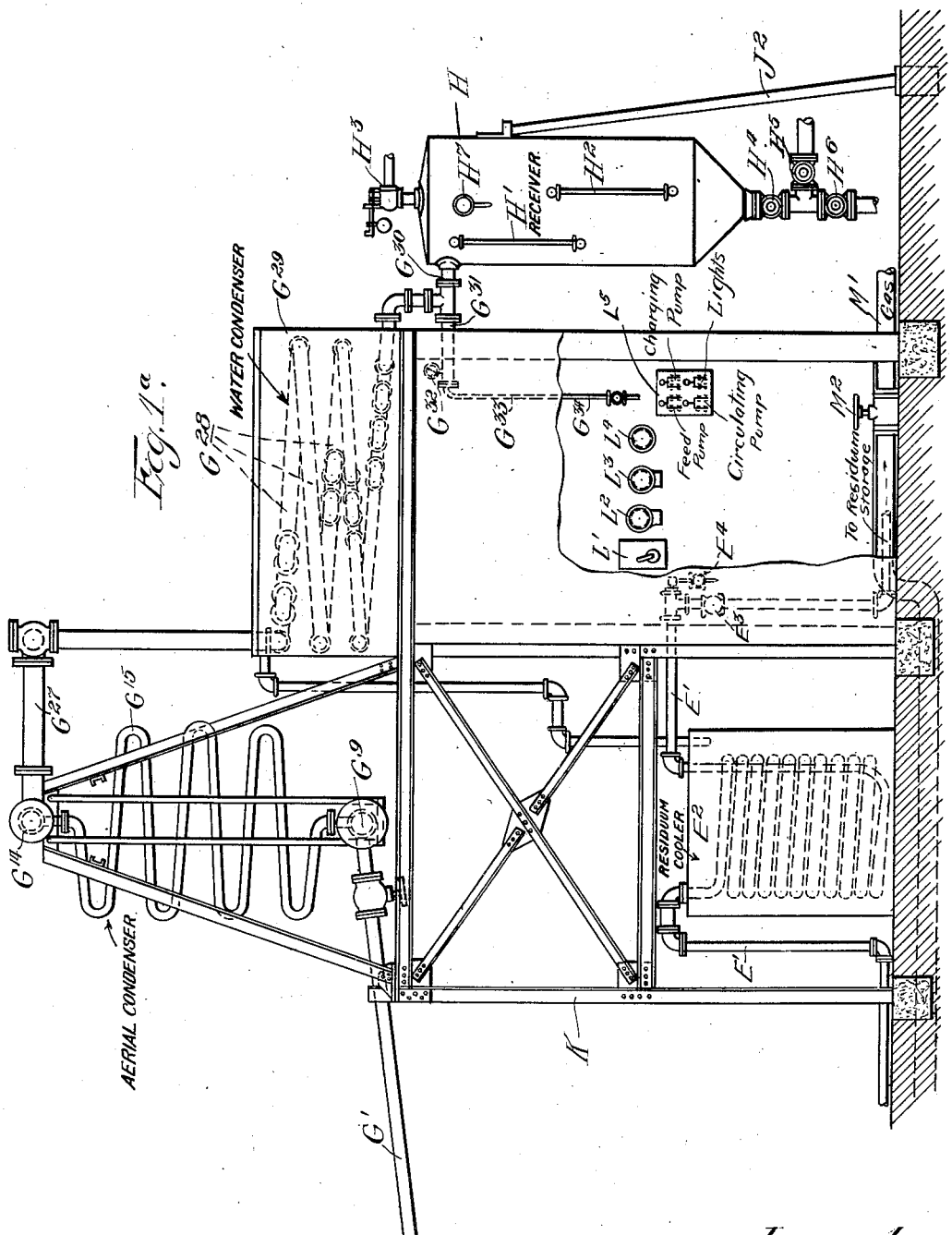

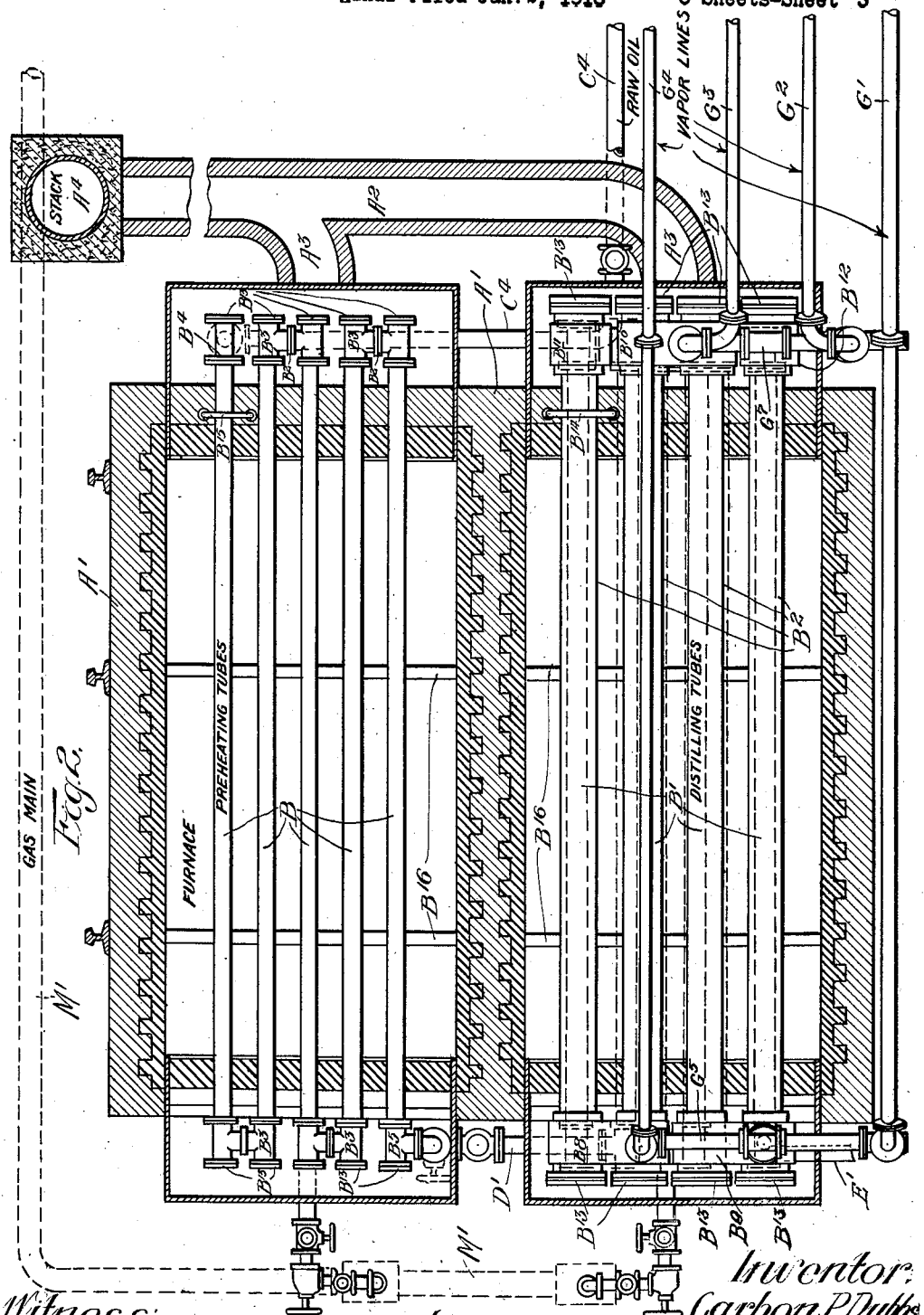

Dec. 13, 1927.
C. P. DUBBS
1,652,167
PROCESS OF TREATING HYDROCARBON OILS
Original Filed Jan. 2, 1918    6 Sheets-Sheet 4
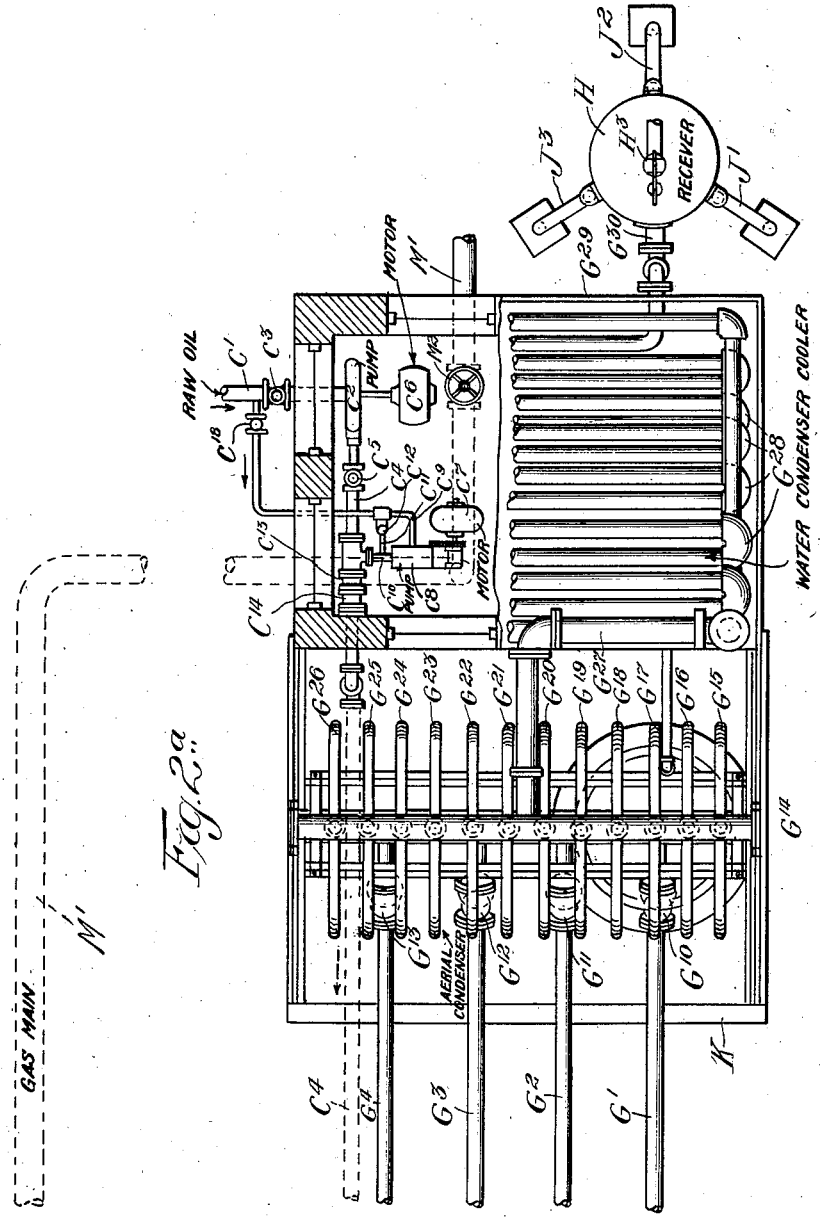
Witness:
Inventor:
Carbon P. Dubbs
by Frank L. Belknap, Atty.

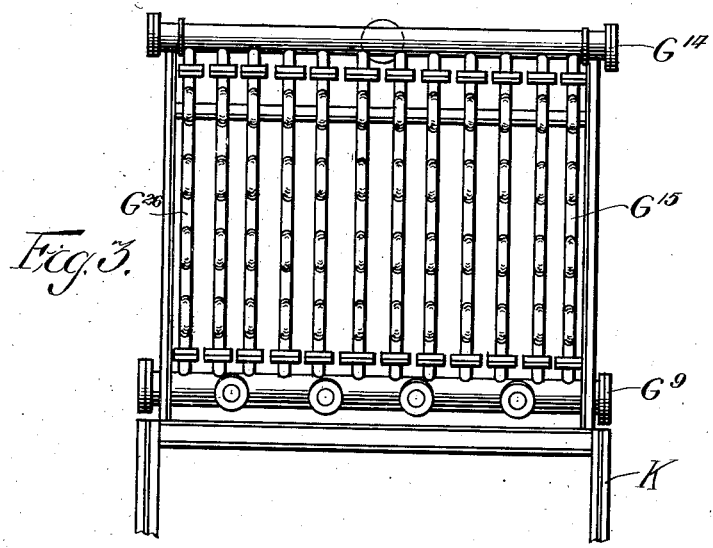
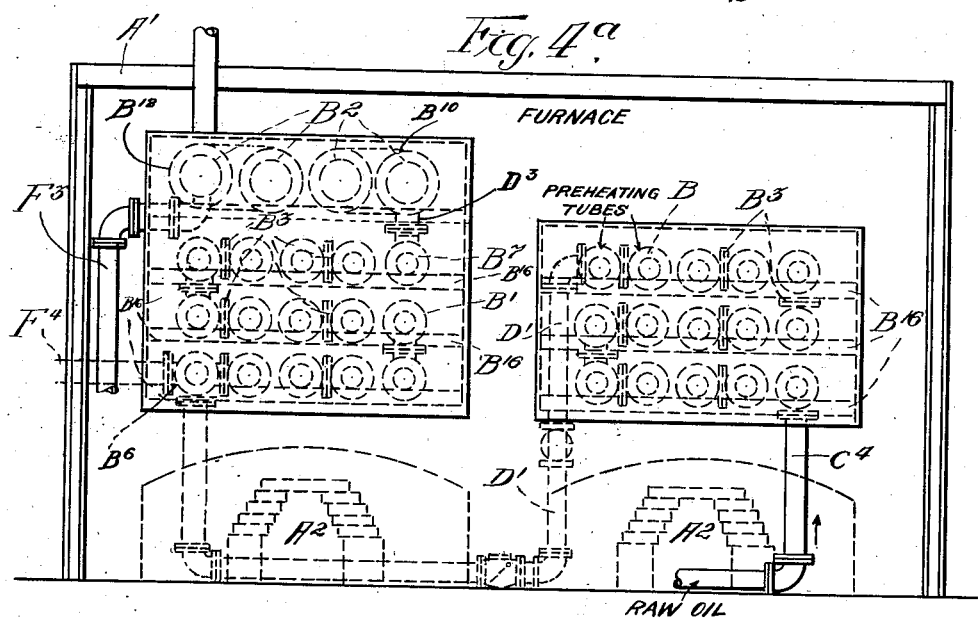

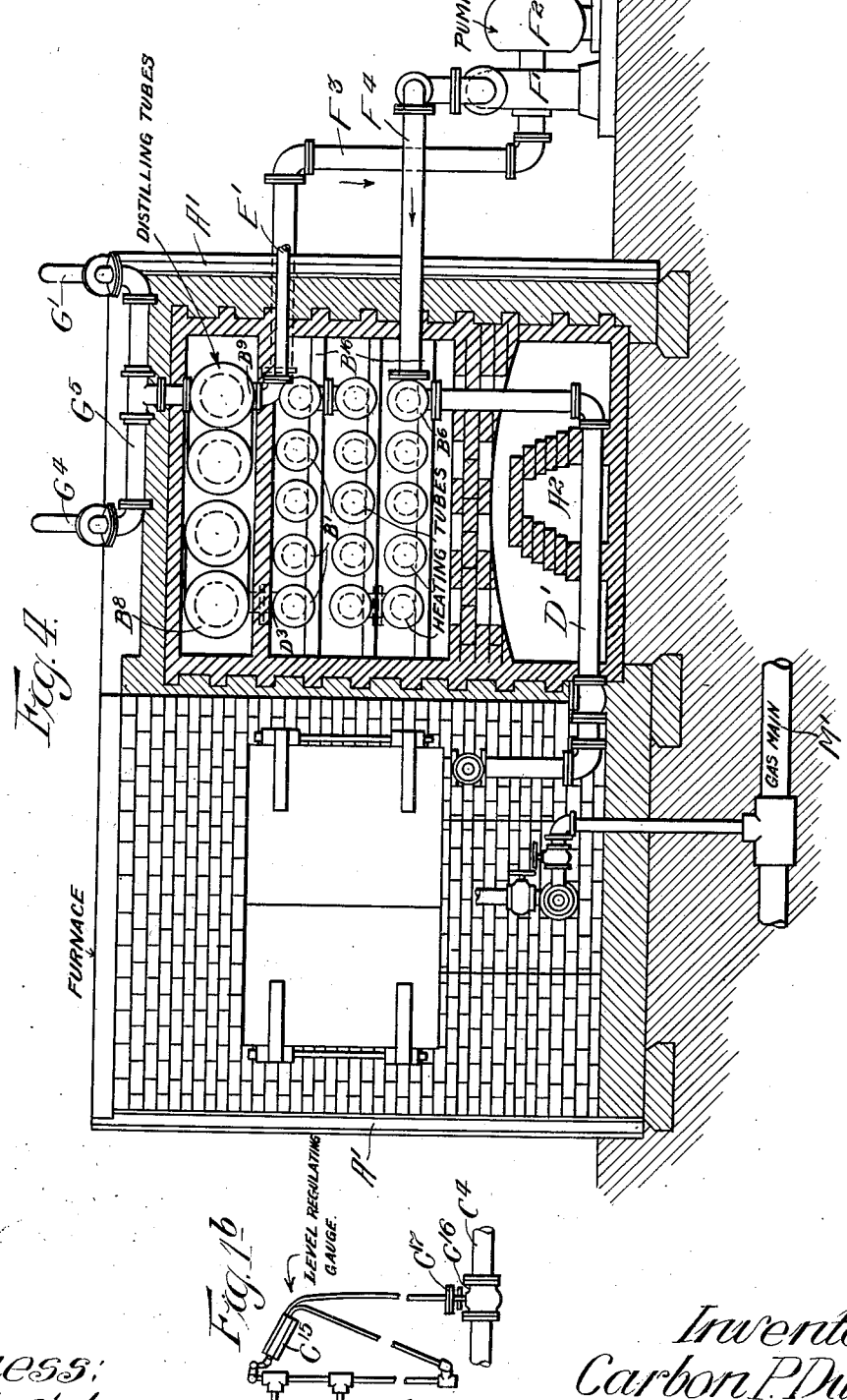

Patented Dec. 13, 1927.

1,652,167

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

PROCESS OF TREATING HYDROCARBON OILS.

Continuation of application Serial No. 209,897, filed January 2, 1918. This application filed May 2, 1923. Serial No. 636,104. Renewed March 10, 1927.

This invention relates to a process for treating hydrocarbon oils to produce therefrom products having lower boiling points.

This application is a continuation of an earlier application filed by me, under date of January 2, 1918, Serial No. 209,897.

Among the salient objects of the invention are to provide an improved process in which the heated hydrocarbons are circulated through a heating coil and into and through a coil still, and then passed to a condenser, and during such treatment subjected to a pressure of the generated vapors; to provide a process in which the temperature and pressure are readily and accurately controlled; to provide a process which can be operated continuously; to provide a process which avoids the danger of the tubes in same being overheated and burned out by precipitation of a substantial amount of carbon in said tubes, by means of sufficient circulation of the oil through said tubes; to provide a process whereby those products that are not sufficiently converted to the desired low boiling point, are condensed and returned and further circulated through said heating tubes; to provide a process, in which, by means of air cooled reflux condensers, the grade of distillate drawn from the system is controlled and such distillate not of sufficient low boiling point is condensed and automatically returned to the heating zone and distilling coils and subjected to further treatment; to provide a process in which the furnace, in which the heating tubes are contained, is maintained within well defined temperature ranges and the oil caused to circulate through said heating tubes, the rapidity of the circulation of the oil governing, to a great extent, the temperature at which the furnace is maintained, as well as governing the amount of low boiling point products made and removed from said oil, the oil passed from these heating tubes to what is known as the distilling tubes which are contained in a compartment above the furnace in which the heating tubes are situated and these distilling tubes are maintained in a temperature, at or a little above that temperature that is best for producing and distilling off the desired low boiling point products from that particular oil under treatment; to provide, in general, an improved process of the character referred to.

In the drawings:

Fig. 1 and Fig. 1$^a$ together show the side elevation of the apparatus partly in section and with other parts broken away. Fig. 1$^b$ is a side view of the liquid level regulator and diaphragm valve, shown in fragmentary section.

Fig. 2 and Fig. 2$^a$ are a plan view of the construction shown in Fig. 1 and Fig. 1$^a$.

Fig. 3 is a detail view of one of the condenser members.

Fig. 4 is a view, partly in end elevation and partly in section, of the heating coils. Fig. 4$^a$ is a view of the opposite end of Fig. 4, showing the arrangement of the heating and distilling coils.

Referring to the drawings, $A^1$ are furnaces in which the heating tubes and distilling tubes are contained. $A^2$ is a tunnel through which the fire for heating the furnaces passes. $A^3$ is a flue tunnel. $A^4$ is a flue and stack.

B constitute parallel substantially level preheating tubes. $B^1$ constitute parallel substantially level heating tubes. $B^2$ constitute parallel substantially level distilling tubes. $B^3$ are return T's on the preheating tubes B and heating tubes $B^1$. $B^8$, $B^9$ and $B^{10}$ are return fittings on the distilling coils. $B^{11}$ and $B^{12}$ are T's on the distilling coils, and each of these fittings are fitted with flanges marked $B^{13}$ that bolt on so that each tube can be cleaned. $B^{14}$ and $B^{15}$ are bands around the tubes for anchoring the tubes shown. With the exception of that end of the particular tubes shown as anchored the tubes are free and all extend through the furnace wall and expand independently thereof. $B^{16}$ designates braces for supporting the tubes B, $B^1$ and $B^2$.

$C^1$ is a feed line from any source of supply leading to pump $C^2$, and in this line is throttle valve $C^3$. $C^4$ is a charging line from the pump to the preheating tubes B, and in this line is throttle valve $C^5$. $C^6$ and $C^7$ are motors for operating the pumps $C^2$ and $C^8$. $C^8$ is a pump which is supplied through line $C^9$ branching from suction line $C^1$. $C^{10}$ is discharge line connecting this pump with charging line $C^4$, and branching off of discharge line $C^{10}$ is a branch line $C^{11}$, which connects with suction line $C^9$ and having positioned on it a pressure relief valve or by-pass valve $C^{12}$. $C^{14}$ is a standard make check valve. $C^{15}$ is an automatic liquid level gauge, and the one shown here is that which is furnished by "S-c" Regulator Company of Fostoria, Ohio, and $C^{15}$ shown attached to the end of distilling tubes $B^2$ operates to open and close the valve $C^{16}$, which valve is connected with valve $C^{15}$ by a diaphragm $C^{17}$, valve $C^{16}$ being positioned on the supply line $C^4$. It will be understood that any suitable method may be employed for regulating the level in the distilling tubes $B^2$. As this regulator is of standard equipment and operates on well known principles and the valve operated by a diaphragm is of standard make and well understood, I have not gone into the description of same here, nor do I claim any part of the regulator itself as new.

$B^4$ is a fitting connecting preheating tubes B to the supply line $C^4$. $B^5$ is a fitting on the other end of the preheating tubes B through which the oil in same is discharged into line $D^1$. Line $D^1$ is connected to the bottom of fitting $B^6$ which is secured to the heating tubes $B^1$. The oil from the heating tubes $B^1$ passes to the distilling tubes $B^2$ through transfer line $D^3$. The oil or residuum is discharged through the bottom of the fitting $B^9$ by means of the line $E^1$ from the distilling coil $B^2$, said oil or residuum passing through cooling tank $E^2$ and then passing to any suitable storage, not shown, and between such storage and cooling tank $E^2$ are positioned in the line $E^1$ a throttle valve $E^3$ to control the rate of flow of the residuum from the line $E^1$, and a similar throttle valve $E^4$ is positioned in the line $E^1$ for obtaining samples of said residuum from said line $E^1$.

$F^1$ is a centrifugal pump. $F^2$ is a motor for operating same. $F^3$ is a suction line to the pump from distilling tubes $B^2$ coming out of the bottom of the fitting $B^{12}$. $F^4$ is discharge line which enters the side of the fitting $B^6$ on the end of the tubes $B^1$.

$G^1$, $G^2$, $G^3$ and $G^4$ are upwardly inclined vapor lines leading off of the distilling tubes $B^2$. Lines $G^1$ and $G^4$ connect with manifold $G^5$, which manifold connects by pipe $G^6$ to fitting $B^9$ attached to the distilling tubes $B^2$. Lines $G^2$ and $G^3$ connect to manifold $G^7$, which manifold connects by means of pipe $G^8$ to the top of the fitting $B^{12}$ on the end of the distilling tubes $B^2$. The vapor lines $G^1$, $G^2$, $G^3$ and $G^4$ are connected at their upper end to a common header marked $G^9$, and have positioned on them throttle valves marked $G^{10}$, $G^{11}$, $G^{12}$ and $G^{13}$. Said manifold $G^9$ is connected to a top manifold $G^{14}$ by means of bent pipes $G^{15}$ to $G^{26}$; and to the center of the top manifold $G^{14}$ is connected pipe $G^{27}$ which in turn connects to coils $G^{28}$, contained in water tank $G^{29}$. From the coils $G^{28}$, the condenser extends through pipe $G^{30}$ into receiving tank H. From pipe $G^{30}$ is a branch pipe $G^{31}$ having a pressure indicating gauge $G^{32}$, and out of pipe $G^{31}$ extends pipe $G^{33}$ on the end of which is a valve marked $G^{34}$. This valve and gauge may be situated in the tail house and afford means for there regulating the pressure.

On H are glass liquid gauges $H^1$ and $H^2$, pressure relief valve $H^3$, drawoff valves $H^4$, $H^5$ and $H^6$ and pressure gauge $H^7$. $H^6$ is for use in case water is to be drawn off before draining the distillate out through valve $H^5$. $H^4$ is a valve for use in an emergency, for example, when one of the other valves are removed for repair or renewal, and is superficial for showing the workings of the apparatus.

$J^1$, $J^2$ and $J^3$ are supports for the receiving tank H. K is a support for the pipes as shown.

$L^1$ is a standard indicating pyrometer and is connected with different thermosticks which thermosticks are positioned in the furnace in which the tubes $B^1$ and $B^2$ are positioned. $L^2$ is a standard temperature recording instrument and is connected to a thermostick by a cable, and which thermostick is positioned inside the manifold $G^{14}$. $L^3$ is a standard temperature recording instrument connected by means of a cable to thermosticks, which latter are positioned, one in the preheating coils marked B to give the temperature of the oil therein, and one positioned in the heating coils marked $B^1$ to give the temperature of the oil therein; and one positioned in the distilling coils marked $B^2$ to give the temperature therein. $L^4$ is a standard indicating gauge, which is connected by tubing to the receiving tank H, and shows the depth of the liquid contained in the receiving tank H. $L^5$ is an electric switchboard of standard make, which board contains a standard knife switch for breaking or completing the circuit for operating the charging pump $C^2$; also a knife switch for breaking or completing the circuit for controlling the motor $C^7$, which operates the circulating pump $C^8$; also a knife switch for breaking or completing the electric circuit for controlling the electrically driven circulating pump marked $F^1$; also a knife switch of standard make for breaking or completing the electric current for supplying the electric lights in the plant, all of which are enclosed in the house built beneath the water cooling tank $G^{29}$.

$M^1$ is a gas main for supplying the furnaces in which the tubes B, $B^1$ and $B^2$ are contained, and on this line is a throttle valve marked $M^2$.

Describing now the operation of the process, the material to be treated is drawn from any suitable source of supply through line C¹ by and through centrifugal pump C², through line C⁴ into the preheating tubes B. Then through line D¹ to the heating tubes B¹, after passing through the tubes B¹ the heated oil passes upwardly through line D³ into distilling tubes B², and when these latter tubes have been filled to the desired level, pump C² is shut down and valve C³ on line C¹ and valve C⁵ on line C⁴ are closed and normally remain closed during the rest of the run. Heat is applied to the furnaces A¹ and as soon as a desired vapor pressure has been created on the apparatus, then supply pump C⁸ is started in operation and obtains its supply of raw material through line C⁹ and discharges through line C¹⁰ into line C⁴, valve C¹⁸ being opened and should the level of the liquid in the distilling tubes B² be of the proper height, then the liquid level regulator C¹⁵ will, by means of diaphragm C¹⁷, close the valve C¹⁶ on supply line C⁴, and the back pressure thus created on the line C⁴ will force open the pressure relief valve C¹² and by-pass the oil from the discharge side of pump C⁸ back into suction line C⁹, and this operation will continue until the level in the distilling tubes B² drops to a sufficient point to permit the valve C¹⁶ to be automatically opened, thus admitting more raw material into the heating tubes B, B¹ and distilling tubes B².

The pump F¹ is put and maintained in operation, and the oil contained in the heating tubes B¹ and distilling tubes B² made to circulate by drawing the oil through suction F³ and discharging it back into the tubes through discharge F⁴. It will thus be seen that the oil, after passing through the heating tubes B¹, and the distilling tubes B², is recirculated through these tubes through the agency of the pipe lines F³ and F⁴ and the pump F'. This causes a cyclic circulation of the oil in which the particles move continuously through a defined path.

The residuum formed in the distilling tubes B² is drawn off either intermittently or continuously through line E¹ through cooling coils contained in tank E² and from there to any suitable storage. The quantity that is drawn off is regulated by means of valve E³ positioned in line E¹, and samples of said residuum may be obtained at any time by means of valve E⁴ in line E¹.

The vapors generated pass up through lines G¹, G², G³ and G⁴ and manifold G⁹ and from there up through pipes G¹⁵ to G²⁶ and into manifold G¹⁴. All the vapors condensed up to this point are drained back into distilling tubes B² and the remaining vapors pass through line G²⁷ through condensing coils G²⁸ immersed in water in tank G²⁹ and from there pass through line G³⁰ into receiving tank H, from which they may be drawn off intermittently or continuously through valves H⁴, H⁵ or H⁶.

It will be seen that this method provides a process for automatically and continuously treating petroleum for the production of low boiling point products and by means of the circulation of the liquid in the heating tubes B¹ and the distilling tubes B² permits of the furnace in which the tubes B¹ are positioned being maintained at a considerably higher heat without injurious effect to the oil, and all vapors that are generated are released from the oil frequently as the same is circulated and passes through the distilling tubes, both of which are of great advantage in greatly facilitating the production of low boiling point products.

The entire system is preferably subjected to a vapor pressure of from 50 to 500 pounds, although the pressure will vary with the conditions. The temperature of the oil will vary from 500 to 1,000 degs. F., although I do not intend to limit myself to these figures. The pumps are preferably operated so as to cause a relatively rapid circulation of the oil.

The preheating and heating tubes used in this type of apparatus for treating mid-continent gas oil are preferably of 4" diameter and the distilling tubes 10" pipe. The vapor lines are substantially of the same diameter as the heating tubes. An illustrative run of this process is as follows: Gas oil from the mid-continent field of approximately 32 degs. Baumé was introduced to the preheating tubes and the temperature raised from 500 to 700 degs. F., and subsequently to 800 degs. F. or 900 degs. F., in the heating tubes. The heated oil was then directed to the distilling tubes where the cracking of the oil took place at a temperature approximately the same or slightly less than that of the heating tubes. The system was maintained under a pressure of about 100 to 150 pounds per square inch and when a substantial distillation of the oil was noted by the collection of distillate in the receiver, the oil was locally circulated from the distilling tubes back through the heating tubes under considerable force maintained by the pressure pump delivering the oil to the heating tubes at a considerable velocity, thereby decreasing to a great extent, the collection of carbon in the heating and distilling zones and at the same time resulting in a greater yield which amounted to from 50 to 65% high grade distillate.

I claim as my invention:

1. A process of converting heavy into lighter hydrocarbons, consisting in passing the oil through a relatively small coil in a heating zone, thence passing the oil through a relatively larger vapor generating or distilling coil, also seated in said heating zone, taking off vapors from said distilling coil and condensing the same, maintaining a forced cyclic circulation of the oil from the small coil to the distilling coil and back to the small coil and during said treatment, maintaining a pressure in excess of 50 pounds to the square inch on the oil in said coils.

2. A process for continuously converting heavy into light hydrocarbons, consisting in passing the oil through a relatively small coil in a heating zone, thence passing the oil through a relatively larger vapor generating coil also seated in said heating zone, taking off vapors from said vapor generating coil, subjecting such vapors to a reflux condensing action, in returning the reflux condensate resulting therefrom to said vapor generating coil, in maintaining a forced cyclic circulation of the oil from said small coil to the vapor generating coil and back to the small coil during the treatment of the oil, and in maintaining a superatmospheric pressure on the oil in said coils.

3. A process for continuously converting heavy into light hydrocarbons, consisting in preheating the oil, in passing the preheated oil through a small heating coil, in transferring the oil from said small heating coil into a relatively larger vapor generating coil, taking off vapors from said vapor generating coil, subjecting such vapors to a reflux condensing action, in returning reflux condensate resulting therefrom to said vapor generating coil for further treatment, in maintaining a forced cyclic circulation of the oil from said small heating coil to the vapor generating coil and back to said small coil during the treatment of the oil, in continuously withdrawing heavy carbon-containing residual oil from said vapor generating coil to be isolated from the system, and in maintaining a superatmospheric pressure on the oil undergoing conversion.

4. A process for converting heavy into lighter hydrocarbons, comprising passing hydrocarbon oil through a relatively small coil in a heating zone, thence delivering the heated oil to a relatively larger vapor generating coil, taking off vapors from said vapor generating coil and condensing the same, maintaining a forced cyclic circulation of the oil from the small coil to the vapor generating coil and back to the small coil, and, during the process, maintaining a superatmospheric pressure on the oil undergoing conversion.

CARBON P. DUBBS.